United States Patent
Garoff et al.

(10) Patent No.: US 7,238,637 B2
(45) Date of Patent: Jul. 3, 2007

(54) METHOD FOR THE PREPARATION OF OLEFIN POLYMERIZATION CATALYSTS

(75) Inventors: Thomas Garoff, Helsinki (FI); Kari Pesonen, Monninkylä (FI); Päivi Waldvogel, Porvoo (FI); Timo V. Laine, Vantaa (FI); Peter Denifl, Gries am Brenner (AT); Jarmo Lindroos, Kulloo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/515,997

(22) PCT Filed: Dec. 18, 2002

(86) PCT No.: PCT/EP02/14462

§ 371 (c)(1),
(2), (4) Date: Jul. 29, 2005

(87) PCT Pub. No.: WO03/106510

PCT Pub. Date: Dec. 24, 2003

(65) Prior Publication Data

US 2006/0111523 A1    May 25, 2006

(30) Foreign Application Priority Data

Jun. 18, 2002 (EP) .................. 02013305

(51) Int. Cl.
*C08F 4/642* (2006.01)
*C08F 4/64* (2006.01)
*C08F 4/02* (2006.01)

(52) U.S. Cl. .................. 502/115; 502/103; 526/124.2; 526/124.3

(58) Field of Classification Search ............... 502/103, 502/115; 526/124.2, 124.3
See application file for complete search history.

(56) References Cited

U.S. PATENT DOCUMENTS

| | | | |
|---|---|---|---|
| 4,399,054 A * | 8/1983 | Ferraris et al. | ............. 502/125 |
| 4,540,679 A | 9/1985 | Arzoumanidis et al. | |
| 4,845,177 A | 7/1989 | Vogt et al. | |
| 5,188,999 A | 2/1993 | Duranel et al. | |
| 5,212,133 A | 5/1993 | Duranel et al. | |
| 6,291,385 B1 | 9/2001 | Lee et al. | |
| 2004/0242406 A1 * | 12/2004 | Denifl et al. | ................. 502/102 |
| 2004/0242407 A1 * | 12/2004 | Denifl et al. | ................. 502/102 |

FOREIGN PATENT DOCUMENTS

| | | |
|---|---|---|
| CN | 1334276 | 2/2002 |
| EP | 0083073 | 7/1983 |
| EP | 0083074 | 7/1983 |
| EP | 0258089 | 3/1988 |
| EP | 0536840 | 4/1993 |
| EP | 451 876 | 11/1995 |
| EP | 0713886 | 5/1996 |
| EP | 0926165 | 6/1999 |
| EP | 0856013 | 7/2000 |
| EP | 02013305 | 6/2002 |
| JP | 6049119 A | 2/1994 |
| JP | 2000044621 A | 2/2000 |
| WO | WO 97/20790 | 6/1997 |
| WO | WO 98/44009 | 10/1998 |
| WO | WO 00/08073 | 2/2000 |
| WO | WO 00/08074 | 2/2000 |
| WO | WO 01/38405 | 3/2001 |
| WO | WO 01/55230 | 8/2001 |

OTHER PUBLICATIONS

A. Endres and G. Mass, "Die fluorige Phase: Organische Chemie mit hochfluorierten Reagenzien und Lösungsmitteln," Chemie in unserer Zeit, 34. Jahrg. 2000, Nr. 6: 382-393.
Lo Nostro et al., "Phase Separation Properties of Fluorocarbons Hydrocarbons and Their Copolymers", Advances in Colloid and Interface Science, 56:245-287 (1995).
Boor, John, "Ziegler-Natta Catalysts and Polymerizations", Academic Press, pp. 180-185 (1979).

* cited by examiner

*Primary Examiner*—Caixia Lu
(74) *Attorney, Agent, or Firm*—McDonnell Boehnen Hulbert & Berghoff LLP (57) ABSTRACT

The invention provides a process for producing an olefin polymerization catalyst comprising a catalyst component formed by contacting at least (a) a compound of Group 1 to 3 of the Periodic Table (IUPAC) with (b) a transition metal compound of Group 4 to 10 of the Periodic Table (IUPAC) or a compound of an actinide or lanthanide, in the form of solid catalyst particles, said process comprising: (1) preparing a solution from said compounds; (2) dispersing said solution to a solvent immiscible therewith and inert in relation to said compounds, to obtain an emulsion in which said solution forms the dispersed phase; and (3) solidifying the catalyst component in the dispersed droplets.

36 Claims, 3 Drawing Sheets

METHOD FOR THE PREPARATION OF OLEFIN POLYMERIZATION CATALYSTS

The present invention relates to a process for the production of catalysts, particularly of Ziegler-Natta type of catalysts for olefin polymerisation, to the catalysts as such, and to their use in polymerising olefins.

BACKGROUND ART

Ziegler-Natta (ZN) type polyolefin catalysts are well known in the field of polymers, generally, they comprise (a) at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), and, optionally, a compound of Group 13 of the Periodic Table (IUPAC) and/or an internal donor compound. ZN catalyst may also comprise (b) further catalyst component(s), such as a cocatalyst and/or an external donor.

Various methods have been developed for preparing ZN catalysts. In one conventional method a supported ZN catalyst system is prepared by impregnating the catalyst components on a particulate support material. For example in WO-A-01 55 230 of Borealis, the catalyst component(s) are supported on a porous, inorganic or organic particulate carrier material, such as silica. In a further well known method the carrier material is based on one of the catalyst components, e.g. on a magnesium compound, such as $MgCl_2$. This type of carrier material can also be formed in various ways: EP-A-713 886 of Japan Olefins describes the formation of Mg solution by melting $MgCl_2$ with an alcohol which is then emulsified and finally the resultant mixture is quenched to cause the solidification of the droplets. Alternatively, EP-A-856 013 of BP discloses the formation of a solid Mg-based carrier, wherein the Mg component containing phase is dispersed to a continuous phase and the dispersed Mg phase is solidified by adding the two-phase mixture to a liquid hydrocarbon.

The formed solid carrier particles are normally treated with a transition metal compound and optionally with other compounds for forming the active catalyst.

Accordingly, in case of above external carriers, the morphology of the carrier is one of the defining factors for the morphology of the final catalyst. However also the subsequent surface treatment of the particles may have an impact on the morphology of the final supported catalyst.

One disadvantage encountered with the supported catalyst systems is that the surface treatment (impregnation step) of the support with one or more catalytically active compounds may lead to non-uniform distribution of the active component(s) and in turn to an inhomogeneous polymer material.

WO-A-00 08073 and WO-A-00 08074 of Borealis describe a further method for producing a solid ZN catalyst, wherein a solution of a Mg-based compound and one or more further catalyst compounds are formed and the reaction product thereof is precipitated out of the solution by heating the system. Furthermore, EP-A-926 165 of Borealis discloses another precipitating method, wherein a mixture of $MgCl_2$ and Mg alkoxide is precipitated together with a Ti compound to give a ZN catalyst.

EP-A-83 074 and EP-A-83 073 of Montedison disclose methods for producing a ZN catalyst or a precursor thereof, wherein an emulsion or dispersion of Mg and/or Ti compound is formed in an inert liquid medium or inert gas phase and said system is reacted with an Al alkyl compound to precipitate a solid catalyst. According to examples said emulsion is then added to a larger volume of Al compound in hexane to cause the precipitation.

In EP-A-258 089 of Montedison an emulsion of a catalyst components, or a precursor thereof, comprising a Mg and/or Ti compound is formed in perfluoropolyether and the dispersed phase is reacted with a reducing and/or halogenating agent to precipitate said catalyst components or a precursor thereof. According to the examples said emulsion is then added to a larger volume of a solution of a halogenating agent and $TiCl_4$ treatment is further continued in the formed suspension to effect the surface treatment of the particles.

In general, a drawback of such precipitation methods is the difficulty to control the precipitation step and thus the morphology of the precipitating catalyst particles.

Furthermore, the precipitation of the catalyst component(s) may often proceed via a "tar-like" intermediate stage. Said undesired sticky precipitate agglomerates easily and sticks to the walls of the reactor. The morphology of the catalyst would then of course be lost.

Furthermore, in addition to above heterogeneous catalyst systems, homogeneous catalyst systems, wherein the catalyst component(s) are used in a form of a solution in the actual polymerisation process are also known in the art. For instance, EP-A-536 840 of Enichem discloses i.a. the preparation of a catalyst emulsion by contacting in an inert diluent a Mg dialkyl and Al trichloride. This emulsified precursor is then contacted with at least one compound of a transition metal to obtain the final catalyst in the form of an emulsion. The emulsion is used as such for polymerisation of olefins.

The use of homogeneous catalysts in industrial applications has been limited due to their fast deactivation behaviour. In case of emulsions also stability problems may occur.

Accordingly, although much development work has been done in the field of Ziegler-Natta catalysts, there remains a continuing search for alternative or improved methods of producing ZN catalysts with desirable properties.

SUMMARY OF THE INVENTION

The object of the present invention is to provide a further method for producing solid Ziegler-Natta catalyst particles comprising at least one catalyst component.

Another object of the present invention is to provide a new process for producing solid particles of a Ziegler-Natta catalyst in a controlled manner, whereby particles with a preferable chemical composition distribution and morphology, such as a spherical shape, an uniform particle size (a narrow particle size distribution) and/or advantageous surface properties, can be obtained.

A further object of the present invention is to provide an olefin polymerisation process using the catalyst prepared according to the process of the invention, as well as a catalyst obtainable by the method of the invention.

DESCRIPTION OF THE INVENTION

In a first embodiment, the invention is based on the finding that a solution which is prepared by contacting at least: (a) a compound of Group 1 to 3 of the Periodic Table (IUPAC, Nomenclature of Inorganic Chemistry, 1989), with (b) a transition metal compound of Group 4 to 10 of the Periodic Table (IUPAC), or a compound of an actinide or lanthanide;

for forming an olefin polymerisation catalyst component; can be converted, in a controlled manner, to a solid particulate form with advantageous properties:

by dispersing said solution to a solvent immiscible therewith and inert in relation to said compounds, to obtain an emulsion in which said solution forms the dispersed phase; and by solidifying the catalyst component in the emulsion droplets.

Surprisingly, the present conversion method enables to create the morphology of the final catalyst in situ during the solidification step of the catalyst component(s). The invention thus provides a controlled method to obtain active catalyst particles with highly preferable morphology, e.g. with a predetermined spherical shape, uniform particle size distribution without using any added external porous support material, such as an inorganic oxide, e.g. silica. Also desirable surface properties can be obtained.

Moreover, the invention provides a process for producing an olefin polymerisation catalyst, which comprises a catalyst component formed by contacting at least: (a) a compound of Group 1 to 3 of the Periodic Table (IUPAC), with (b) a transition metal compound of Group 4 to 10 of the Periodic Table (IUPAC), or a compound of an actinide or lanthanide; in the form of solid catalyst particles, comprising:

preparing a solution from said compounds;

dispersing said solution to a solvent immiscible therewith and inert in relation to said compounds, to obtain an emulsion in which said solution forms the dispersed phase;

and solidifying the catalyst component in the droplets; and optionally recovering the solid catalyst particles.

Preferably, (c) a compound of Group 13 of the Periodic Table (IUPAC) is added to the dispersed phase before solidifying the catalyst component in the droplets.

By "Preparing a solution from said compounds" is meant that the catalyst forming compounds (a), (b) and, optionally (c), may be combined in one solution which is dispersed to the immiscible solvent, or, alternatively, at least two separate catalyst solutions for each or part of the catalyst forming compounds may be prepared, which are then dispersed successively to the immiscible solvent.

Alternatively, the invention provides a process for producing an olefin polymerisation catalyst which comprises a catalyst component formed at least from (a) a compound of Group 1 to 3 of the Periodic Table (IUPAC) and (b1) a chlorine-containing transition metal compound of Group 4 to 10 of the Periodic Table (IUPAC) and/or (c1) a chlorine-containing compound of Group 13 of the Periodic Table (IUPAC); in the form of solid catalyst particles, comprising:

preparing a solution from said compounds;

dispersing said solution to a solvent immiscible therewith and inert in relation to said compounds, to obtain an emulsion in which said solution forms the dispersed phase;

and solidifying a catalyst component or a catalyst precursor in the droplets; and optionally recovering the solid catalyst particles.

In a further embodiment, the present invention is directed to a process for producing an olefin polymerisation catalyst, comprising a catalyst component comprising (a) a compound of group 1 to 3 of the Periodic Table (IUPAC) (b) a transition metal compound of group 4 to 10 of the Periodic Table (IUPAC) and (c1) a chlorine-containing compound of group 13 of the Periodic Table (IUPAC), said process comprising:

preparing a solution from said compound a);

dispersing said solution to a solvent immiscible therewith and inert in relation to the compounds; adding compound (c1) to the dispersed solution; and solidifying a precursor of a catalyst component in the dispersed droplets; and optionally recovering the solid particles;

treating said particles with compound b), and optionally other catalyst forming compounds, to obtain catalyst particles; and, optionally, recovering the solid catalyst particles.

In the recovery step the solid catalyst (or catalyst precursor) particles may be isolated, optionally washed and dried in a manner known in the art to obtain said catalyst as particulate solids.

The term "to a solvent immiscible therewith and inert in relation to said compounds" means herein that said solvent forming the continuous phase is chemically inert. Preferably, the solvent of said continuous phase does not contain dissolved therein any significant amounts of catalyst forming compounds ((a), (b) or (c,c1)) as defined below under "Catalyst Compounds and preparation of the solution". Thus the solid particles of the catalyst are formed in the droplets from the compounds which originate from the dispersed phase (i.e. are provided to the emulsion in a solution dispersed into the continuous phase).

The term "emulsion" used herein covers both bi- and multiphasic systems.

In one embodiment of the invention said catalyst component may be formed, in addition to above said compounds, also from further compounds, which can be added to the solution of the catalyst component forming compounds before or after the dispersing step. Such further compounds, may be those conventionally used in the art, such as an aluminium compound and/or an internal donor compound, preferably an aluminium compound, such as a compound of formula VI as defined below, e.g. an alkyl aluminium halide.

Furthermore, in addition to the catalyst component as defined above, the catalyst of the invention may comprise further catalyst component(s), such as a cocatalyst and/or an external donor compound known in the art. The further catalyst component(s) can be incorporated to the catalyst during the preparation method of the invention, or added separately with the catalyst of the invention at the actual polymerisation step.

Accordingly, the invention enables the inclusion of all the desired compounds to the dispersed phase and thus the solidification of the final composition of the catalyst component(s). As a consequence, the obtained particles need no subsequent surface treatment(s) normally required for supported catalyst systems of the prior art. Thus, the preferable morphology achievable with the present bi- or multiphase solidification method can be maintained.

Moreover, in the catalyst particles prepared according to the invention, the active catalyst sites can be evenly distributed throughout the particle compared e.g. to the prior art supported systems. An uniform distribution of the chemical composition, both intra- and interparticles, can thus be obtained. Advantageously, the catalyst particles of the invention have an a uniform catalytical behaviour in a polymerisation process. E.g. the catalyst can provide a uniform start-up of the polymerisation in a polymerisation process.

If desired, however, the catalyst comprising the catalyst component(s) of the invention, or a catalyst precursor of the invention (comprising (a) a compound of group 1 to 3 of the Periodic Table and (c1) a chlorine-containing compound of group 13 of the Periodic Table), can further be surface treated with further compound(s) in a manner known in the art.

Dispersed Phase

The solution to be dispersed into the immiscible solvent can be any solution prepared from the catalyst component(s) forming compounds, provided that it is in a form of a liquid when dispersed into the continuous phase. Said term "solution" is understood herein broadly to include solutions prepared from (a) one or more catalyst forming compound in liquid form, (b) from an inert solvent, and/or (c) a melt of said compound(s); as described herein below.

In case of an inert solvent, any suitable solvent which dissolves said compounds may be used, preferably an organic solvent including linear or branched aliphatic, alicyclic and aromatic hydrocarbons, suitably an aliphatic or aromatic hydrocarbon, e.g. pentane, hexane, heptane, toluene, benzene etc. A mixture of solvents may also be used, provided that said mixture dissolves the compounds and is immiscible with the continuous phase at least during the emulsion formation step.

Continuous Phase

The solvent used to form the continuous phase is chosen, as stated above, to be inert, and also immiscible with the solution to be dispersed at least at the conditions (e.g. temperature) used during the dispersing step. Said solvent may also be a mixture of one or more solvents. Furthermore, the solvent is chosen so that the compounds and possible intermediate(s) thereof which form the solidifying catalyst component(s) as defined under "Catalyst Compound and Preparation of the Solution", as well as the solidified catalyst, are practically insoluble or only poorly soluble to the continuous phase.

In a preferred embodiment of the invention said solvent forming the continuous phase is an inert solvent including halogenated organic solvents, preferably fluorinated organic solvents and particularly semi, highly or perfluorinated organic solvents and functionalised derivatives thereof, which means that said solvents may contain other functional groups and/or further halogens such as chlorine, bromine and/or iodine.

Examples of the above-mentioned solvents are semi, highly or perfluorinated (a) hydrocarbons, such as alkanes, alkenes and cycloalkanes, (b) ethers, e.g. perfluorinated ethers and (c) amines, particularly tertiary amines, and functionalised derivatives thereof. Preferred are semi, highly or perfluorinated, particularly perfluorinated hydrocarbons, e.g. perfluorohydrocarbons of e.g. C3-C30, such as C4-C10. Specific examples of suitable perfluoroalkanes and -cycloalkanes include perfluorohexane, -heptane, -octane and -(methylcyclohexane). Semi fluorinated hydrocarbons relates particularly to semifluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr. 6, and of Pierandrea Lo Nostro in "Advances in Colloid and Interface Science, 56 (1995) 245-287, Elsevier Science Dispersing Step The emulsion can be formed by any means known in the art: by mixing, such as by stirring said solution vigorously to said solvent forming the continuous phase or by means of mixing mills, or by means of ultra sonic wave. A further possibility is to use a so called phase change method for preparing the emulsion by first forming a homogeneous system which is then transferred by changing the temperature of the system to a biphasic system so that droplets will be formed. If needed, part of the catalyst forming compounds may be added after the emulsion system is formed.

The emulsion formation via "one phase" change may be one preferable method, especially when e.g. fluorinated solvents are used as the continuous phase, since the miscibility of the fluorinated solvents, in particular perfluorinated solvents, with common organic solvents (e.g. alkane, such as pentane, hexane, chloroform, toluene) is dependent on the temperature so that a one phase system (homogeneous phase) of the fluorous solvent and a common organic solvent can be formed above a certain critical temperature.

The two phase state is maintained during the emulsion formation step and the solidification step, as, for example, by appropriate stirring.

The ratio of catalyst component(s) forming solution and the solvent immiscible therewith is chosen so that the first solution forms the discontinuous phase (droplets) in the bi- or multiphase system.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), preferably halogenated hydrocarbons, such as semi- or highly fluorinated hydrocarbons optionally having a functional group, or, preferably semi-, highly- or perfluorinated hydrocarbons having a functionalised terminal, can be used.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system. This embodiment is not bound to the present invention, but, in principal, can be used for forming any emulsion system, and also for preparing catalysts other than the present Ziegler Natta type catalysts, e.g. single site (such as metallocene) catalysts.

Examples of the surfactant precursors usable for forming said reaction product include e.g. known surfactants which bear at least one functional group selected e.g. from —OH, —SH, $NH_2$, —COOH, —$COONH_2$, and/or any reactive derivative of these groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. a compound (c) as defined below) and/or a transition compound (e.g. a compound (b) as defined below).

The addition of the surfactant precursor can be effected before or after the dispersing step, suitably after the dispersing step of part or all, preferably all, of the catalyst forming compounds. In a preferred embodiment a highly fluorinated $C_{1-n}$— (suitably $C_{4-30}$— or $C_{5-15}$—) alcohol (e.g. highly fluorinated heptanol, octanol or nonanol) is added to a solution of a compound (a), compound (b) and/or (c) to form the "actual" surfactant. The addition is preferably effected after a solution of compounds (a), (c) (or (c1)) and (b) as defined below, is dispersed to a solvent forming the continuous phase.

These and any further additives and/or compounds can be added to the system in any stage of the dispersing and/or solidification step, if needed.

The droplet size and size distribution of the formed discontinuous phase can be selected or controlled in a manner known in the art, i.a. by the choice of the device for emulsion formation and by the energy put into emulsification.

In the preparation process of the invention the solution may already contain all the compounds (to be added) before the dispersing step thereof. Alternatively, e.g. depending on the reactivity of the compounds, the dispersed phase can be formed first from one or more of the compounds and, thereafter, the other compound(s) can be added separately to said dispersed phase. Said other compounds can be added in a form of a solution or already in a form of an emulsion. Portion-wise additions of the dispersed phase are also possible.

Solidification Step

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In case all the reacting compounds are already present in the dispersed droplets, the rate of the solidification reactions occurring in said droplets may be accelerated by increasing the temperature of the dispersed phase in the emulsion system.

In a further embodiment, the solidification reactions of the compounds are started after the formation of the emulsion system. Accordingly, a solution of one or more of the starting compounds of a catalyst component(s) is first dispersed into the inert, immiscible solvent, and thereafter, the other(s) of the starting compounds is added to said first dispersed phase to start the solidification reactions therein. Again, heating or cooling can be used during and/or after such additions.

Alternatively the solidification may be effected (or accelerated) by removing the solvent from the droplets or in case of a molten liquid catalyst by cooling the system.

The solidification may also be controlled by the reaction time.

Moreover, the solidification may be effected during the dispersing (droplet formation) step or preferably after the emulsion system is formed, optionally, by heating or cooling the system.

The system may be heated gradually, up to 10° C. per minute, preferably 0.5 to 6° C. per minute and more preferably 1 to 5° C. per minute.

Alternatively, if desired, the emulsion system may be subjected to a very rapid temperature change to cause a fast/immediate (e.g. in 0.1 to 10 s, such as in few seconds) solidification in the dispersed system.

The appropriate temperature change, i.e. an increase or a decrease in the temperature of an emulsion system, required for the desired solidification rate of the components cannot be limited to any specific range, but naturally depends on the emulsion system, i.a. on the used compounds and the concentrations/ratios thereof and/or on the used solvents, and is chosen accordingly. Temperature difference of e.g. 5 to 100° C., such as 10 to 100° C., or 20 to 90° C., such as 50 to 80° C., e.g. 70 to 80° C. can be used. It is also evident that any techniques may be used to provide sufficient heating or cooling effect to the dispersed system to cause the desired solidification.

In one embodiment the heat treatment is effected by bringing, e.g. dispersing, such as spraying or preferably siphoning, the emulsion system to an inert receiving medium. The temperature of the receiving system can be significantly higher than that of the emulsion to cause an instant solidification of the reaction product in the droplets. The receiving medium can be gaseous, e.g. air, or a liquid, preferably a solvent, and suitably the same as used as the continuous phase in the formation of the emulsion. Thus e.g. a perfluorinated hydrocarbon as defined above or a mixture thereof with other solvents, e.g. with an aliphatic or aromatic hydrocarbon as defined above, can be used.

Preferably the receiving medium is mixed during the siphoning step. The siphoning techniques are known in the art. Preferably the "phase change" as used for forming an emulsion can also be utilised for solidifying the catalytically active contents within the droplets of an emulsion system by, again, effecting a temperature change in the dispersed system, whereby the solvent used in the droplets becomes miscible with the continuous phase, e.g. with the fluorous continuous phase as defined above, so that the droplets become impoverished of the solvent and the solidifying components remaining in the "droplets" start to solidify. Thus the immisciblity can be adjusted with respect to the solvents and conditions (temperature) to control the solidification step The miscibility of e.g. fluorous solvents with organic solvents can be found from the literature and be chosen accordingly by a skilled person. Also the critical temperatures needed for the phase change are available from the literature or can be determined using methods known in the art, e.g. the Hildebrand-Scatchard-Theorie. Reference is also made to the articles of A. Enders and G. and of Pierandrea Lo Nostro cited above.

Thus according to the invention, the entire droplet or only part of the droplet may be converted to a solid form. The size of the "solidified" droplet may thus be smaller or greater than that of the original droplet, if e.g. the amount of the monomer used for the prepolymerisation is relatively large.

The solidified catalyst particles may be subjected to washing step(s).

In a still further embodiment of the invention the catalyst component(s) are prepolymerised within the droplets to obtain the solid catalyst particles. This can be effected by adding a monomer, e.g. an olefin monomer, in liquid or in gaseous form to the dispersed phase and by polymerising said monomer within the droplets in the presence of the catalyst composition. Alternatively, a monomer(s) can be used as a solvent for the dispersed phase which is then polymerised after the dispersing said solution. Monomers and reaction conditions for the prepolymerisation can be chosen in a manner known in the field.

In the method of the invention the droplet shape of the particles may be substantially maintained. The formed particles may have an average size range of 1 to 500 μm, e.g. 5 to 500 μm, advantageously 5 to 200 μm or 10 to 150 μm. Even an average size range of 5 to 50 μm is possible. The size may be chosen depending on the polymerisation the catalyst is used for. Advantageously, the particles are essentially spherical in shape. According to one preferable embodiment, the catalyst particles have a low porosity and a low surface area.

One of the further advantages of the solidification of the dispersed droplets according to the invention is that the undesirable tar formation can be avoided.

Catalyst Compounds and Preparation of the Solution

The idea of the present invention lies in the emulsion/solidification method which provides the advantageous morphology of the final catalyst. Therefore this invention is not limited to a specific ZN catalyst composition, but covers the preparation of any ZN catalyst, the starting material of which can be provided in liquid state during the preparation step. E.g. ZN catalysts for (co)polymerising ethene (PE catalyst) or propene (PP catalyst) can be prepared.

The various possibilities of the compounds and combinations are within the skills of a person in the field. Accordingly, the solution of catalyst forming compounds can be formed by contacting:

a. (referred generally below as) Compound (a): at least one compound of Group 1 to 3, preferably Group 2, of the Periodic Table (IUPAC), such as a Mg compound, having a general formula selected from:

$Mg(OR^1)_{2-n}X_n$ (I), wherein each $R^1$ is independently a $C_{1-20}$ hydrocarbyl group, e.g. $C_{2-15}$ group, preferably $C_{3-10}$ group, such as $C_{4-8}$ group, e.g. linear, cyclic or branched alkyl, aryl, aralkyl, or alkaryl, suitably a linear or branched alkyl, preferably a branched alkyl, such as 2-ethyl-1-hexyl, or ethyl, propyl, butyl, pentyl, hexyl, heptyl, octyl, which may optionally be substituted with halogen; each X is independently a halogen, preferably chlorine; $0 \leq n \leq 2$ and n may or may not be an integer.

$Mg(OR^1)_{2-n}(R^2)_n$ (II), wherein each $R^1$ independently and n are as defined above in formula (I);

each $R^2$ is independently a hydrocarbyl as defined for $R^1$, e.g. linear or branched alkyl, such as ethyl, propyl, butyl, pentyl, hexyl, heptyl, octyl. Preferably $0 \leq n < 2$. In a preferred embodiment of the invention, said compound (a) is a magnesium hydrocarbyloxy compound of formula $Mg(OR^1)_{2-n}(R^1)_n$ (II), wherein each $R^1$ and $R^2$ are independently as defined above; and $0 \leq n < 2$, which may be commercially available or, preferably, can be prepared as described below by contacting a magnesium alkyl compound of formula $Mg(R^2)_2$ (VII), wherein each $R^2$ is independently as defined above, with an alcohol $R^1OH$, wherein $R^1$ is as defined above;

$MgX_2 \cdot mTi(OR^1)_4$ (III), wherein each X and $R^1$ are independently as described above in formula (I); $0.1 \leq m \leq 3$; and/or complexes of $MgX_2$ with electron-donor compounds;

b. (referred generally below as) Compound (b): with at least one transition metal compound of Group 4 to 10, or a compound of lanthanide or actinide, preferably a transition compound of Group 4 to 6, more preferably of Group 4, of the Periodic Table (IUPAC), such as a Ti compound, wherein, particularly preferred, a tetravalent Ti compound can be used, and examples of such compounds are:

$TiX_4$ (IV), wherein each X is independently as defined above in formula (I), such as Cl;

$Ti(OR^1)_{4-p}X_p$ (V), wherein each X and $R^1$ are independently as defined above in formula (I)

p is 0, 1, 2 or 3;

and optionally with further compound(s), e.g.

c. (referred generally below as) Compound (c): with at least one compound of Group 13 of the Periodic Table (IUPAC), preferably an aluminium compound, such as $Al(R^1)_xX_{3-x}$ (VI), wherein each $R^1$ and X are independently as defined above in formula (I) and $0 \leq x \leq 3$; preferably $0 \leq x < 3$; e.g. dimethyl aluminium chloride, diethyl aluminium chloride, diisobutyl aluminium chloride, ethyl aluminium dichloride (EADC) and methyl aluminium dichloride; and/or d. optionally with at least one (internal) electron donor, e.g. those known in the art for (co)polymerising propylene and higher olefins including organic compounds containing oxygen, nitrogen, sulphur and/or phosphorus, such as organic acids, organic acid anhydrides, organic acid esters, alcohols, ethers, aldehydes, ketones, amines, amine oxides, amides, thiols, various phosphorus acid esters and amides, and the like, added as such or formed in situ (see also WO 00 08074 and WO 00 08073)

As the chlorine-containing compound (b1) or (c1) used in an alternative embodiment of the invention together with a compound of Group 1 to 3 of the Periodic Table, e.g. those chlorine containing Al (c1) and/or Ti compounds. (b1), such as an aluminium alkyl compound and/or a tetravalent titanium compound each containing chlorine as listed above, can be used (i.e. Compound (c) and/or (b) bearing at least one chlorine are referred herein as Compound (c1) and (b1), respectively).

As mentioned above the solid catalyst particles may contain further catalyst component(s), such as cocatalysts and/or external donor(s), depending on the used polymerisation process, in a manner known in the art. As the cocatalyst, e.g. conventional activators based on compounds of Group 13 of the Periodic Table (IUPAC), e.g. organo aluminium, such as aluminium alkyl compounds (e.g. triethylaluminium) compounds, can be mentioned. Additionally, in case of the (co)polymerisation of polypropylene or higher olefins, one or more external donors can be used which may be selected e.g. from silanes or from the list of internal donor of point (d) above.

It is also possible to include other catalyst component(s) than said ZN components to the catalyst of the invention.

The used amounts/ratios of the compounds to keep the made catalyst composition in liquid state during the emulsion formation step are also within the skills of a person in the field. Such solutions can be prepared e.g. according or analogously to methods described in the prior art literature. As an example:

(i) by dissolving a magnesium compound, e.g. Mg halide, such as $MgCl_2$, optionally in elevated temperature, in a carboxylic acid, an amine or, preferably, an alcohol, e.g. a mono alcohol, $R^1OH$, wherein $R^1$ is as defined above in formula (I), e.g. alkyl, such as n-butanol, or phenol, optionally in the presence of an inert solvent, in a manner described e.g. in US 5,212,133, US 5,188,999, EP 713 886 and WO 98 44009; and by adding the other compounds of the invention;

(ii) by forming a solution of a Mg compound with an Al compound as such at elevated temperature, or in the presence of an aromatic component and/or a chlorinated hydrocarbon, analogously to the methods described in EP 536 840 and/or EP 083 073/EP 083 074; and, preferably, by adding a transition metal compound, e.g. $TiCl_4$, and optional other compounds to the obtained liquid composition while keeping the solution in liquid state for the dispersing step;

(iii) by heating alkoxides of Mg and Ti, or a combination of halogenides and alkoxides of Mg and Ti. Alternatively, Mg halogenide and Ti alkoxides can be treated with excess of HCl to form a solution. See e.g. EP 876 318 for preparing such Mg- and Ti-based solution, wherein the other compounds of the invention can be added;

(iv) by using the principles described in EP 856 013, wherein Mg component, e.g. Mg alkoxides, Mg hydrocarbyl alkoxides or Mg hydrocarbyl, in hexane+($CO_2$ or $SO_2$) form a Mg-based solution. To said solution the other compounds of the invention can be added;

(v) by reacting a magnesium hydrocarbyloxy compound with a chlorine-containing compound in a non-polar hydrocarbon solvent; and by adding a chlorine containing tetravalent titanium compound, e.g. analogously to WO 01 55230, to form a soluble Mg—Al—Ti complex to be used in the present invention.

The preparation of the solution may also result in a bi- or multiphase liquid/liquid form already in the preparation step of said solution. Such system can be subjected as such to the solidification step or added to an immiscible solvent of the invention as such or after the separation of the catalyst forming phase.

EMBODIMENTS OF THE INVENTION

Preferably (the Compounds (a), (b) and (c) are as defined above):

1. A Catalyst solution of Compound (a), (b) and (c) is dispersed to an immiscible solvent; and the catalyst component is solidified in the dispersed droplet phase. Said catalyst solution is prepared by forming a solution of Compound (a); adding to said solution separately first Compound (c), preferably in a form of a solution, and then Compound (b), preferably in a form of a solution.

The formation of solution of (a) and (c) can be effected at a temperature of 0-100° C., e.g. at 20-80° C. Preferably the compound (b) is added at a lower temperature, e.g. at 0-30° C. The dispersion step may be effected at 0-100° C., e.g. at about 0-70° C., such as at 0-30° C.; or 2. A solution of Compound (a), optionally combined with a solution of Compound (c), is prepared and dispersed to an immiscible solvent; then a solution of Compound (b) is added to the dispersed phase; and the catalyst component is solidified in the dispersed droplet phase.

In case Compound (c) is added to a solution of Compound (a), then Compound (c) can be added to the solution of (a) before or after, preferably before, said dispersion step of the solution of Compound (a). Suitably, Compound (b) is added as a solution to the dispersed phase of Compound (a) containing optionally Compound (c). Alternatively, a separate emulsion can also be formed from Compound (b), which is then added to said emulsion of Compound (a) and, optionally, of Compound (c). The solution and the dispersion formation steps can be effected at the temperatures indicated above in the embodiment (1); or 3. A solution of Compound (c) is dispersed to an immiscible solvent; a solution of Compound (a) is added to the dispersed phase of Compound (c) to form a solid reaction product as a precursor of the catalyst component, which is then optionally recovered, i.e. isolated and/or washed with a wash solution; the obtained solid reaction product is slurred in a solvent and treated with a Compound (b). The solution and the dispersion formation steps can be effected at the temperatures indicated above in the embodiment (1). The treatment with Compound (b) can be effected in a manner known in the art.

In the alternatives (1) to (3) the compound (a), (b) and (c) may be added in molar ratios known in the art, e.g. in molar ratio of the element of Compound (c), e.g. Al, to the element of Compound (a), e.g. Mg, may be between 0.3:1 to 3:1, e.g. 0.5:1 to 2:1, the molar ratio of the element of Compound (b), e.g. Ti, to the element of compound (a), e.g. Mg, may be between 3:1 to 0.1:1, e.g. 2:1 to 0.3:1.

As the continuous phase a fluorinated solvent or a mixture thereof as defined above is preferably used.

An emulsifying agent, such as a surfactant as defined above, is suitably used and this may be added to a catalyst solution or a continuous phase before or after the dispersing step. Preferably, a highly fluorinated alkanol as defined above may be added e.g. to the formed emulsion as the surfactant precursor as defined above.

As pointed out above, said emulsifying and/or emulsion stabilising aid can be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

In the specific embodiments below, preferable compounds (a), (b) and (c) as defined above have been indicated, wherein each "hydrocarbyl" means independently as under "$R_2$" above; each "alkyl" as such or as part of "alkoxy" means independently as defined under "$R^1$" above.

In one embodiment of the invention the liquid catalyst is prepared by contacting a magnesium dihydrocarbyl compound, e.g. magnesium dialkyl, such as butyloctyl-Mg (BOMAG), with an alcohol $R^1OH$, wherein $R^1$ is as defined above, e.g. 2-ethyl-1-hexanol (EHA). To this solution an aluminium compound of formula $Al(R^1)_xX_{3-x}$, wherein $R^1$, X and x are as defined above, preferably Al alkyl halide (e.g. chloride), such as $EtAlCl_2$, and/or a titanium compound, such as $TiCl_4$, is then added. In case both the Al and the Ti compounds are added to Mg—$R^1OH$ complex, then preferably the Al compound is added first. The solution may contain additional solvents as described above, e.g. an aliphatic or aromatic solvent, such as n-heptane. Said solution can be formed at a temperature range at 0-100° C., preferably between the ambient temperature to 100° C., e.g. 40 to 80° C., such as 50 to 70° C., e.g. 60° C. If $TiCl_4$ is added to the solution, this is preferably done at or below room temperature. The obtained solution is then dispersed, e.g. by mixing, to an immiscible solvent, e.g. to a perfluorinated hydrocarbon as defined above. The mixing is suitably carried out at room temperature, but e.g. lower or elevated temperatures may also be used.

To the obtained dispersion an emulsifying agent as defined above, such as a highly or perfluorinated hydrocarbon having a functional terminal, may be added to improve/stabilise the droplet formation. The solidification of the catalyst component in the droplets is preferably effected by raising the temperature of the mixture gradually, e.g. from the room temperature up to 100° C., e.g. up to 60-90° C., in 1 to 120 minutes, e.g. 1-60 or 5-20 minutes. Preferably, the gradual heating comprises a temperature change treatment comprising subjecting the emulsion to gradual temperature change of up to 10° C. per minute, preferably 0.5 to 6° C. per minute and more preferably 1 to 5° C. per minute.

Alternatively, the solidification may be effected by changing rapidly the temperature of said emulsion system, e.g. by siphoning the emulsion to a receiving medium as disclosed above. Said rapid temperature change treatment comprises subjecting the emulsion to a temperature change of more than 40° C., preferably more than 50° C. within less than 10 seconds, preferably less than 6 seconds.

In a further embodiment, a magnesium alkyl is reacted with $R^1OH$ as defined above and, optionally, with an aluminium compound, such as an alkyl aluminium halide, e.g. $EtAlCl_2$, to form a first solution, which is dispersed to an inert solvent, such as perfluorinated hydrocarbon as defined above. To the obtained dispersed phase, $TiCl_4$ solution is then added separately to cause the solidification of the thus formed catalyst component. The emulsion system can be heated during and/or after the addition of the $TiCl_4$. Additional inert solvents as defined above can also be used in the formation of said solutions. Furthermore, the dispersing order of the first solution and $TiCl_4$ solution can be changed.

In another embodiment, Compound (c), preferably an aluminium compound, such as an alkyl aluminium chloride, is dissolved in a hydrocarbon solvent, such as toluene, forming a solution which is dispersed to a continuous phase, preferably to a fluorinated solvent, suitably perfluorinated hydrocarbon, preferably octadecafluorooctane (=perfluorooctane). To the obtained emulsion a hydrocarbon solution, e.g. heptane or toluene, of Compound (a), preferably a magnesium alkoxide, which may preferably be prepared by reacting a magnesium dialkyl of formula VII as defined above, e.g. magnesium butyloctyl, with $R^1OH$ as defined above is added, e.g. at 0-100° C., such as 10-80° C., e.g. 15-30° C. The addition of Compound (a) to emulsion of Compound (c) can be made in a molar ratio of Al:Mg of e.g. 0.5:1 to 2:1, such as 0.7:1 to 1.5:1, or 1:1, e.g. at room temperature. After the addition the temperature can be increased, e.g. up to 80 or 100° C., e.g. up to 60 or 70° C. Then the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. Preferably the washing step is effected in order to adjust the molar ratio of Al:Mg in the obtained support material to a range of at least 0.4 ($\geq 0.4$), e.g. at least 0.6 ($\geq 0.6$), suitably at least 0.85 ($\geq 0.85$), e.g. a ratio between 0.85 and 0.99 (or 1). It has been found that said ratio can bring further benefits to the catalyst precursor of the invention and the subsequent washing step after removal of the (fluorinated) solvents provides a very convenient way of adjusting the desired ratio. The optionally washed solids are then slurred to a fresh solvent, e.g. heptane, and Compound (b), e.g. a tetravalent titanium compound, preferably $TiCl_4$ is added to the slurry, e.g. to obtain a molar ratio of Ti to Mg of the catalyst precursor of 2:1 to 0.3:1, such as 1:1 to 0.5:1, e.g. about 1:1. The addition can be made e.g. at room temperature, and then the temperature can be increased e.g. to 75° C. After the "titanation" step the resulted catalyst is recovered and optionally washed and dried. Thus the present invention enables to prepare a support material comprising Compound (a) and (c) with preferred properties.

Generally, in the final solid catalyst particles, the molar ratio of Mg:Ti can be e.g. between 10:1 to 1:10, preferably 5:1 to 1:1, e.g. 1:1. The molar ratio of Ti:Al can be e.g. between 10:1 to 1:2, e.g. 3:1 to 1:1. Furthermore, in case Compound (a) is prepared by contacting the Mg hydrocarbyl with an alcohol, suitably in a molar ratio of Mg:$R^1OH$ between 1:1 to 1:4, e.g. 1:1 to 1:3.5, such as 1:1.5 to 1:3.1.

Polymerisation Process

As mentioned above the catalyst particles of the invention can be used as such or together with a separate cocatalyst and/or an electron donor, as a Ziegler-Natta catalyst for the (co)polymerisation of an olefin in a manner known in the art. It is also possible to combine said catalyst with one or more other ZN and/or non-ZN catalysts.

The olefin to be polymerised using the catalyst system of the invention can be any olefin polymerisable in a coordination polymerisation including an alpha-olefin alone or as a mixture with one or more comonomers. Preferable olefins are ethylene or propene, or a mixture of ethylene or propene with one or more alpha-olefin(s). Preferable comonomers are C2-C12 olefins, preferably C4-C10 olefins, such as 1-butene, isobutene, 1-pentene, 1-hexene, 4-methyl-1-pentene, 1-heptene, 1-octene, 1-nonene, 1-decene, as well as diene, such as butadiene, 1,7-octadiene and 1,4-hexadiene, or cyclic olefins, such as norbornene, and any mixtures thereof.

Polyethylene and any copolymers thereof are particularly contemplated, as are polypropylene homopolymers and any copolymers thereof.

Polymerisation may be effected in one or more, e.g. one, two or three polymerisation reactors, using conventional polymerisation techniques, in particular gas phase, solution phase, slurry or bulk polymerisation. Polymerisation can be a batch or continuous polymerisation process. Generally a combination of slurry (or bulk) and at least one gas phase reactor is preferred, particularly with gas phase operation coming last.

For slurry reactors, the reaction temperature will generally be in the range of 40 to 110° C. (e.g. 60-110° C.), the reactor pressure will generally be in the range 5 to 80 bar (e.g. 50-60 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerisation may, if desired, be effected under supercritical conditions.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours.

Generally the quantity of catalyst used will depend upon the nature of the catalyst, the reactor types and conditions and the properties desired for the polymer product. Conventional catalyst quantities, such as described in the publications referred herein, may be used.

With the method of the invention a catalyst system with a good morphology is obtained and the catalyst exhibits high catalytic activity. According to the so-called "replica effect" the morphology correlates with product morphology. Thus the catalyst leads to a polymer which also has advantageous properties, e.g. high bulk density.

EXAMPLES

The following examples are provided by way of illustration of the invention. All the used starting materials and solvents are commercially available or can be prepared according to or analogously to the methods described in the literature: $(C_4H_9)_{1.5}Mg(C_8H_{17})_{0.5}$ in 20 wt-% heptane solution: supplied by Crompton, Germany (BOMAG); $EtAlCl_2$ in 18.5 wt-% toluene solution: Crompton, Germany (EADC); triethylaluminium in 10 wt-% heptane solution (TEA-10) or in 20 wt-% heptane solution (TEA-20): Crompton, Germany; TiCl$_4$: Aldrich, Germany; octadecafluorooctane (=perfluorooctane, PFO): P&M Scientific Industrial Association, Russia.

MFR was determined according to ISO 1133 using 190° C., load as subscript. FRR means MFR$_{21}$:MFR$_2$. The particle size distribution was analysed by Coulter.

Example 1

Catalyst

In a 20 ml septa bottle 1.2 ml (1.05 mmol) of BOMAG was added at room temperature in inert conditions. Then 0.328 ml (2.10 mmol) of 2-ethyl-hexanol was added and the components were allowed to react at 60° C. for 30 min while mixing with a magnetic stirrer. After this the solution was cooled down to room temperature, 0.745 ml (1.05 mmol) of EADC was added and the obtained mixture was mixed at 60° C. for 30 min. After this the solution was cooled down to room temperature and 0.115 ml (1.05 mmol) of TiCl$_4$ was added. The obtained solution was dispersed by mixing (105 rpm) in 4.0 ml of PFO to create an emulsion.

In another 150 ml glass reactor 32 ml of PFO was introduced in inert conditions together with 11 ml of heptane. The solvent mixture was stirred by a propeller (mixing speed was 300 rpm). The temperature was risen to 90-95° C.

The solidification was effected by siphoning the catalyst complex emulsion in small portions, during 10 min into the hot receiving solution. After the siphoning the droplets were allowed to stabilise in the receiving vessel for 15 min. After this the receiving solution was cooled down, octadecafluorooctane was removed by siphoning, and the catalyst was washed two times with 30 ml portions of n-heptane. Morphology was good in the resulting catalyst material: spherical particles with an average particle size of 70 μm.

Figure 1:
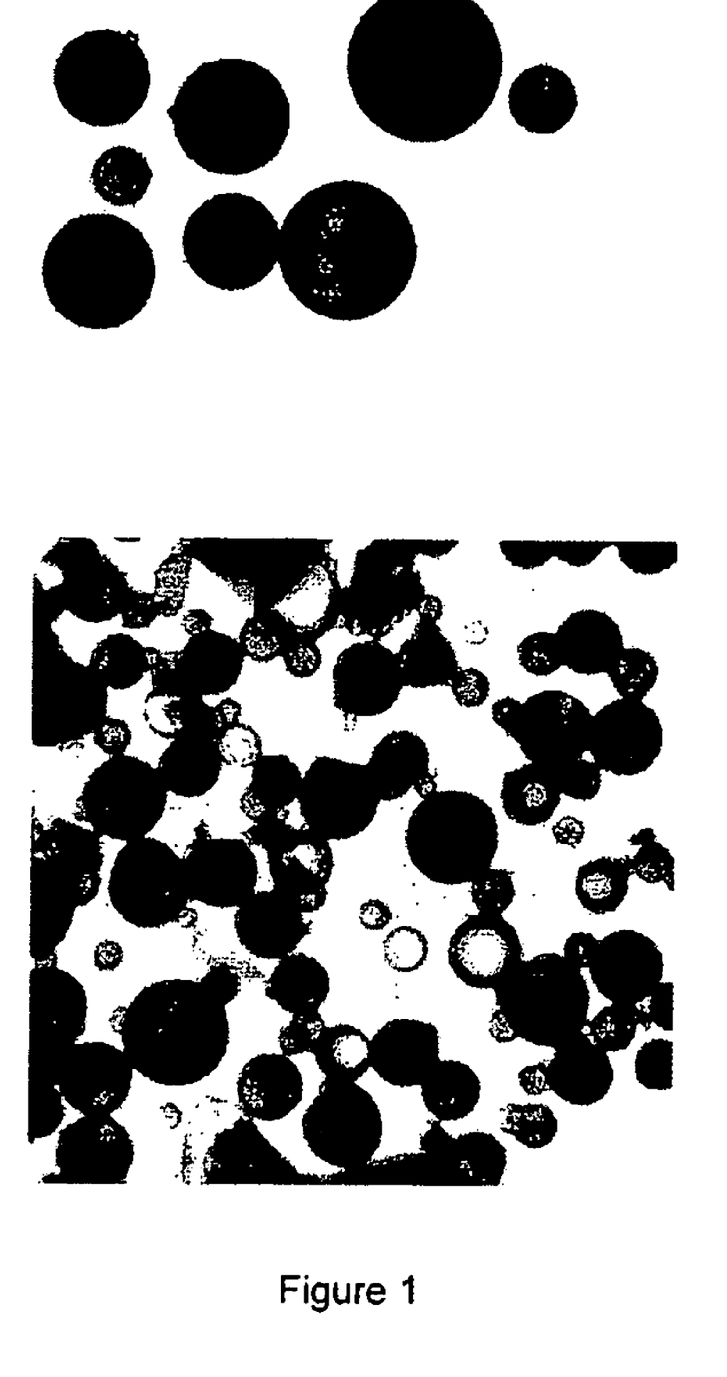
FIG. 1 illustrates the morphology of the catalyst particles of EXAMPLE 1

Composition of the catalyst: Mg 6.99 wt-%, Ti 7.42 wt-%. The added molar ratio of Mg:Ti:Al had been 1:1:1 and the obtained catalyst complex of the invention shows the molar ratio of Mg:Ti:Al of 1.9:1:0.3. The spherical particles with a smooth surface are illustrated in FIG. 1.

Test Polymerisations

The catalyst was tested in a homo-polymerisation of ethene. Two different polymerisation conditions were used in order to produce both high and low molecular flow rate material (HMFR and LMFR). 5 bar of H$_2$ pressure corresponded to LMFR polymerisation conditions, and 17.5 bar to the HMFR conditions. TEA-10 was used as the cocatalyst. An Al/Ti molar ratio of 15 was used in the homopolymerisations (0.9-1.5 ml TEA).

1800 ml (1.127 kg, 15.6 mol) of pentane was introduced into a 3 l autoclave reactor and the temperature was adjusted to 90° C. About 30 mg of Catalyst was added into a feed vessel together with 10 ml (6.3 g, 87 mmol) of pentane. The cocatalyst was added into another feed vessel. The cocatalyst was first let into the reactor and thereafter Catalyst. An additional feed vessel was connected to provide the 5 and 17.5 bar of H$_2$ pressure (110-390 mmol). The polymerisation was started by introducing H$_2$ together with the ethene monomer. A total pressure of 13.7 bar was maintained by the ethene feed throughout the polymerisation. The polymerisation was carried out for 1 h at 90° C. The polymerisation was stopped by venting off the monomer and the pentane.

For the comparison the above polymerisation test was carried out but using a silica supported catalyst as Reference catalyst prepared according to example 3 of EP 688 794 of Borealis, wherein exclusively silica particles with an average particle size of 20 μm (supplied by Grace) were used.

Polymerisation Results Obtained Using Catalyst and Reference Catalyst

TABLE 1

The polymerisation results in LMFR and HMFR conditions

|  |  | Catalyst | Reference Catalyst |
|---|---|---|---|
| LFMR | Activity, kg PE/g |  |  |
|  | cat, h | 14.60 | 4.6 |
|  | MFR$_2$ | 1.0 | 0.52 |
|  | MFR$_5$ | 3.1 |  |
|  | MFR$_{21}$ | 31.4 | 22.0 |
|  | FRR (21/2) | 31.4 | 42.0 |
|  | FRR (21/5) | 10.1 |  |
| HMFR | Activity, kg PE/g |  |  |
|  | cat, h | 5.17 | 2.33 |
|  | MFR$_2$ | 66 | 72 |

Example 2

Preparation of Complex 7.9 g (60.8 mmol) of 2-ethyl-1-hexanol (ROH) was added slowly to 27.8 g (33.2 mmol) of BOMAG. The reaction temperature was kept under 35° C. This complex was used in the following catalyst preparation. The molar ratio ROH/BOMAG was 1.83.

Figure 2:
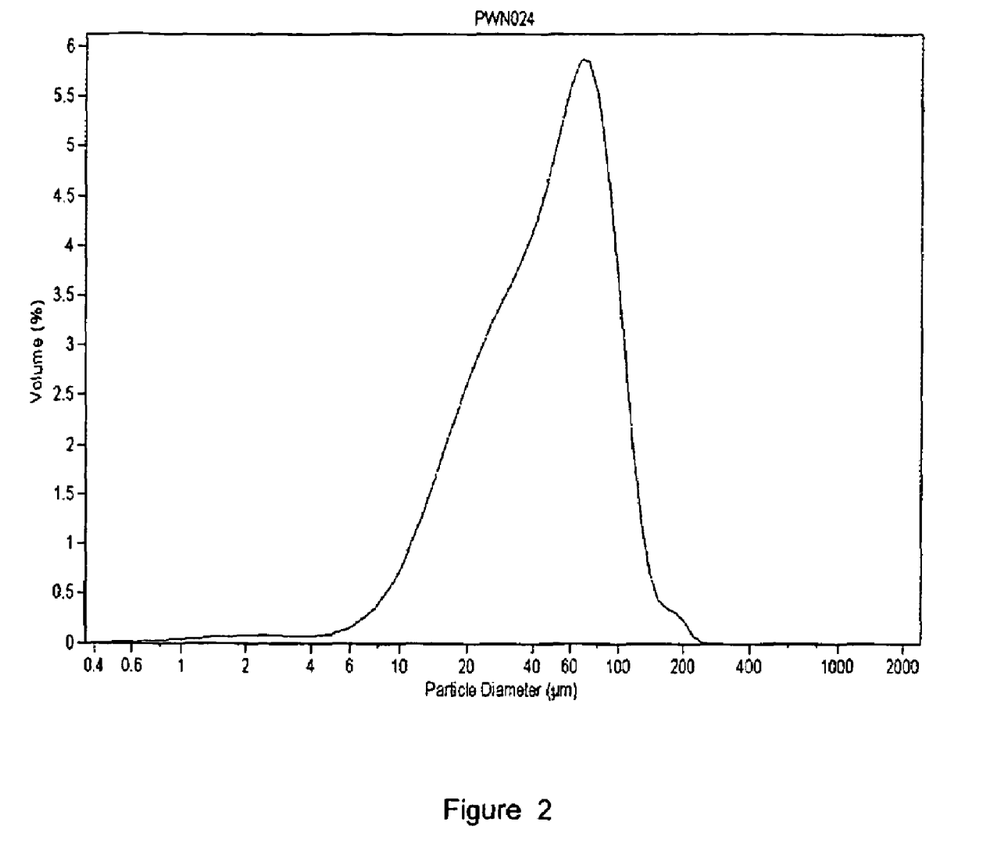
FIG. 2 illustrates the particle size distribution of Catalyst a of EXAMPLE 2

Catalyst a 0.6 ml of TiCl$_4$ (5.5 mmol Ti) and 0,6 ml of n-heptane was added to 45 ml of PFO. The emulsion was stirred (430 rpm) at 75° C. 5.31 g (5.0 mmol Mg) of the above prepared Complex was added and the emulsion stirred for 1 hour at 75° C. The catalyst was washed once with 25 ml of n-heptane, once with 25 ml of n-pentane, dried at 75° C. for 0.5 hour. Composition of the catalyst was: Mg 7.48 wt-%, Ti 10.82 wt-%. Mean particle size: 54 μm. The particle size distribution is illustrated in FIG. 2.

Figure 3:
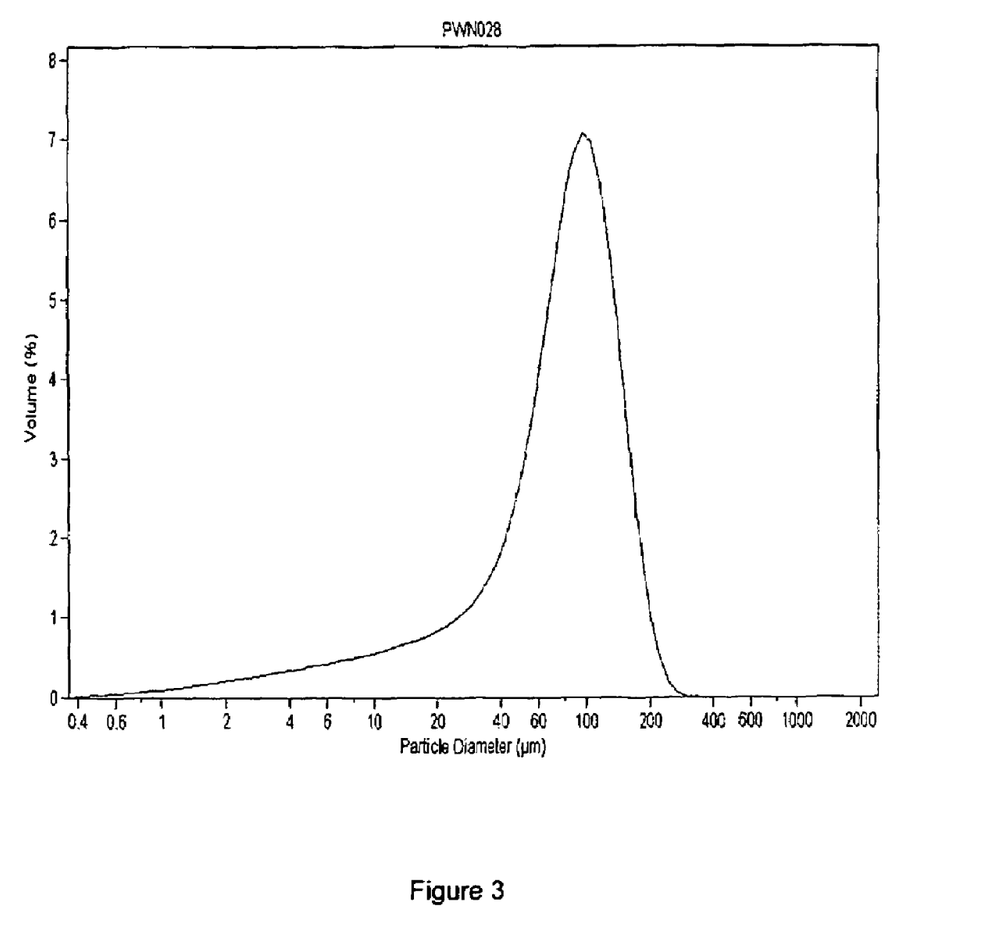
FIG. 3 illustrates the particle size distribution of Catalyst b of EXAMPLE 2

Catalyst b 0.1 ml of TEA-10 was added to 5.3 g (5.0 mmol) of the above Complex and the obtained solution was mixed (mechanical stirrer, 500 rpm) at 25° C. to 60 ml of PFO. A separate TiCl$_4$-emulsion was prepared by mixing 0.6 ml (5.5 mmol) of TiCl$_4$ in 0.6 ml n-heptane with 5 ml of PFO. The TiCl$_4$-emulsion was then added to the emulsion of Complex and TEA-10. Then the emulsion was stirred for one hour at 25° C. The catalyst was washed with n-heptane and n-pentane and dried for 1 hour at 40-50° C. Composition of the catalyst: Mg 7.08 wt-%, Ti 9.9 wt-%. Mean particle size: 82 μm. The particle size distribution is illustrated in FIG. 3.

Catalyst c 0.1 ml of TEA-10 was added to 5.3 g (5.0 mmol) of the above

Complex and the obtained solution was added to 80 ml of PFO and the obtained emulsion was stirred at 5° C. A separate mixture of 0.6 ml (5.5 mmol) of TiCl$_4$, 0.6 ml n-heptane and 5 ml of PFO was mixed and cooled to +5° C. and then added to the emulsion. Then the emulsion was stirred for one hour at room temperature. The catalyst was washed with n-heptane and n-pentane and dried for 1 hour at 40-50° C. Composition of the catalyst: Mg 6.89 wt-%, Ti 10.07 wt-%. Mean particle size: 98 μm.

Catalyst d 0.89 ml of EADC was added to 5.3 g (5.5 mmol) of the above Complex, the mixture was added to 62 ml of PFO and the emulsion was stirred at 75° C. 0,6 ml (5.5 mmol) of $TiCl_4$, was added to the emulsion. Then the emulsion was stirred for one hour at room temperature. The catalyst was washed with heptane and pentane and dried for 1 hour at 40-50° C. Composition of the catalyst: Mg 7.75 wt-%, Ti 11.01 wt-%. Mean particle size: 56 μm.

Catalyst e 3.90 ml of 25 wt.-% ethylaluminumdichloride (EADC) in toluene was added to 7.5 g (6.9 mmol Mg) of the above complex but using ROH/BOMAG of 2.0 and the mixture was stirred for 20 min, after which time 0.38 ml (3.46 mmol) of $TiCl_4$ was added to the solution. This mixture was then transferred to 80 ml of octadecafluorooctane and stirred at room temperature for 5 min to form an emulsion. Next, 0.33 ml (1.75 mmol) of 2,2,3,3,4,4,5,5,6,6,7,7-dodecafluoro-1-heptanol (Apollo Scientific Ltd., UK) was added to the emulsion and the temperature was raised to 75° C. in 12 min. At that temperature the reaction mixture was stirred for one hour. After cooling and phase separation the formed catalyst was collected, washed with heptane and dried for 30 min at 90° C. Composition of the catalyst: Mg 8.33 wt.-%, Ti 7.19 wt.-%, Al 1.64 wt.-%. Mean particle size: 127 μm Test Polymerisations Catalyst a, Catalyst b, Catalyst c and Catalyst d were tested in ethylene homopolymerization as follows: 500 kPa hydrogen was pressurised in 500 ml bomb. 1.8 l of n-pentane was filled into the 3 l reactor and the temperature was increased to 90° C. Catalyst and TEA-20 as the cocatalyst with Al/Ti mole ratio 20-50 were added and ethylene was fed through the hydrogen charging vessel. A total pressure of 14.4 kPa was kept with continuous ethylene feed, so that ethylene partial pressure was 4.4 kPa. Polymerisation was continued for one hour.

TABLE 2

Homopolymerisation results obtained with Catalysts a, b, c, d and e

| | Catalyst a | Catalyst b | Catalyst c | Catalyst d | Catalyst e |
|---|---|---|---|---|---|
| Activity, kg PE/g cat | 33.1 | 26.3 | 32.2 | 15.8 | 14.1 |
| Activity, kg PE/g Ti | 306 | 266 | 320 | 183 | 196 |
| MFR2 | 0.46 | 0.35 | 0.37 | 0.57 | 0.56 |
| MFR21 | 13.9 | 10.7 | 9.37 | 17.23 | 12.2 |
| FRR21/2 | 29.9 | 30.7 | 25.3 | 30.2 | 21.8 |

Example 3

Catalyst

Synthesis with PFO:

5.00 ml (4.38 mmol) of BOMAG was added into a 30 ml septa bottle in inert conditions. To this solution 1.37 ml (8.75 mmol) of 2-ethyl-hexanol was added slowly at room temperature under magnetic stirring. The temperature was increased to 45° C. and the reactants were allowed to react with each other for 30 min.

Into a reactor 25 ml of PFO was added together with 3.36 ml (4.38 mmol) of EADC. With a mechanical stirrer the mixing speed was increased to 460 rpm. The Mg complex solution was added dropwise into the emulsion at room temperature after which the temperature was increased to 60° C. and the reactants were allowed to react with each other for 30 min. The Mg/Al molar ratio in this mixture was 1:1. After settling of the carrier and siphoning off the PFO the carrier was washed twice with 30 ml of heptane at 60° C. for 20 min. Mixing speed 460 rpm.

A new slurry of the carrier was created in 15 ml (10.3 g, 0.102 mol) heptane. 0.48 ml (4.38 mmol) of $TiCl_4$ was added to the slurry, to create a Ti/Mg molar ratio of 1:1. Temperature was increased to 75° C. and the reaction was maintained for 30 min. After siphoning off the liquid, the catalyst was washed twice in 30 ml heptane at 75° C. and last with a similar portion of pentane at room temperature after which the catalyst was dried at 60° C. under a stream of nitrogen for 15 min.

Comparative Catalyst

Preparation of the Catalyst without PFO:

5.00 ml (4.38 mmol) of 20% heptane solution of BOMAG was added into a 30 ml septa bottle in inert conditions. To this solution 1.37 ml (8.75 mmol) of 2-ethyl-hexanol was added slowly at room temperature under magnetic stirring. The temperature was increased to 45° C. and the reactants were allowed to react with each other for 30 min.

Into a reactor 25 ml of heptane ($C_7$) was added together with 3.36 ml (4.38 mmol) of EADC. Mixing speed was increased to 460 rpm. The Mg complex solution was added drop by drop into the solution at room temperature after which the temperature was increased to 60° C. and the reactants were allowed to react with each other for 30 min. The Mg/Al molar ratio in this mixture was 1:1. After settling of the carrier and siphoning off the heptane solution the carrier was washed twice with 30 ml of heptane at 60° C. for 20 min. Mixing speed was 460 rpm.

A new slurry of the carrier was created in 15 ml heptane. 0.48 ml (4.38 mmol) of $TiCl_4$ was now added, to create a Ti/Mg molar ratio of 1:1. Temperature was increased to 75° C. and the reaction was maintained for 30 min. After siphoning off the liquid, the catalyst was washed twice in 30 ml (20.5 g, 0.205 mol) heptane at 75° C. and last with a similar portion of pentane (30 ml, 19.8 g, 0.275 mol) at room temperature after which the catalyst was dried at 60° C. under a stream of nitrogen for 15 min.

Test Polymerisations

Both catalysts prepared with and without PFO, respectively, were tested in ethylene homopolymerisation at high MFR.

1800 ml (1.127 kg, 15.6 mol) of pentane was introduced into a 3 l autoclave reactor and the temperature of the reactor was adjusted to 90° C. TEA-10 was added as cocatalyst. About 5 to 10 mg of the studied Catalyst was added with 10 ml of pentane (6.3 g, 87 mmol). An Al/Ti molar ratio of 15 was used in the homopolymerisations (about 0.5 ml TEA). 17.5 bar of $H_2$ pressure was added to one feed vessel (390 mmol) connected to ethylene feed line. The polymerisation was started by opening the ethylene feed line and thereby introducing both the $H_2$ together with the ethene monomer. A total pressure of 13.7 bar was maintained by the ethene feed throughout the polymerisation. The polymerisation was carried out for 1 h at 90° C. The polymerisation was stopped by venting off the monomer and the pentane.

The polymers were characterised in respect of their MFR values, bulk density (BD) and their particle size distribution (PSD).

TABLE 3

Homopolymerisation results

| Polymerisation | Catalyst | Comparative Catalyst |
| --- | --- | --- |
| Activity, kg PE/g | | |
| cat, h | 17.9 | 9.1 |
| MFR$_2$ | 37 | 27:5 |
| Bulk density, kg/m$^3$ | 345 | 365 |
| Fines %, d < 0.1 mm | 4.9 | 27.4 |
| Big particles %, d > 2 mm | 0 | 0.5 |
| APS, mm | 0.28 | 0.21 |

APS = average particle size

The invention claimed is:

1. A process for producing an olefin polymerization catalyst comprising a catalyst component formed by contacting at least (a) a compound of Group 1 to 3 of the Periodic Table (IUPAC) with (b) a transition metal compound of Group 4 to 10 of the Periodic Table (IUPAC) or a compound of an actinide or lanthanide, in the form of solid catalyst particles, said process comprising:
   (1) preparing a solution from said compounds;
   (2) dispersing said solution to a solvent immiscible therewith and inert in relation to said compounds, to obtain an emulsion in which said solution forms the dispersed phase; and
   (3) solidifying the catalyst component in the dispersed droplets.

2. A process for converting a solution, which is prepared by contacting at least (a) a compound of Group 1 to 3 of the Periodic Table (IUPAC) with (b) a transition metal compound of Group 4 to 10 of the Periodic table (IUPAC) or a compound of an actinide or lanthanide, to a solid particulate form for forming an olefin polymerization catalyst component, said process comprising:
   (1) dispersing said solution to a solvent immiscible therewith and inert in relation to said compounds, to obtain an emulsion in which said solution forms the dispersed phase; and
   (2) solidifying the catalyst component in the dispersed droplets.

3. The process of claim 1, wherein the solution forming the dispersed phase is formed by combining a solution of the metal compound (a) and a solution of the metal compound (b).

4. The process of claim 3, wherein said combination of said solution of the metal compound (a) and said solution of the metal compound (b) is made before the dispersing step or during or after one of said solutions is first dispersed into the immiscible solvent and before the step of solidifying the catalyst component in the dispersed droplets.

5. The process of claim 1, wherein (c) a solution of a compound of metal of Group 13 of the Periodic Table (IUPAC) is added before solidifying the catalyst component in the dispersed droplets.

6. A process for producing an olefin polymerization catalyst comprising a catalyst component formed by contacting at least (a) a compound of Group 1 to 3 of the Periodic Table (IUPAC) with (b1) a chlorine-containing transition metal compound of Group 4 to 10 of the Periodic Table (IUPAC) and (c1) a chlorine-containing compound of Group 13 of the Periodic table (IUPAC), in the form of solid catalyst particles, said process comprising:
   (1) preparing a solution from said compounds;
   (2) dispersing said solution to a solvent immiscible therewith and inert in relation to the compounds, to obtain an emulsion in which said solution forms the dispersed phase; and
   (3) solidifying the catalyst component in the dispersed droplets.

7. The process of claim 1, wherein an inert solvent is used for the preparation of said solution, which solvent is selected from a linear or cyclic alkane or alkene, an aromatic hydrocarbon or a halogen-containing hydrocarbon, and a mixture thereof.

8. The process of claim 1, wherein the inert, immiscible solvent constituting the continuous phase comprises a fluorinated organic solvent or a mixture thereof.

9. The process of claim 8, wherein said fluorinated organic solvent comprises a semi-, highly or perfluorinated organic solvent, a functionalized derivative thereof or a mixture thereof.

10. The process of claim 9, wherein said fluorinated organic solvent comprises a perfluorohydrocarbon, functionalized derivative thereof or a mixture thereof.

11. The process of claim 1, wherein said emulsion comprising said continuous phase and said dispersed phase is a bi- or multiphasic system.

12. The process of claim 1, wherein the solidification of the catalyst component is effected by reacting the compounds present in the droplets dispersed in said inert continuous phase.

13. The process of claim 5, wherein the solidification of the catalyst component is effected by dispersing the solution prepared at least from the compound (a), compound (c), and compound (b) to said inert solvent, and by subjecting the formed emulsion to a temperature change.

14. The process of claim 13, wherein said temperature change treatment comprises subjecting the emulsion to gradual temperature change of up to 10° C. per minute.

15. The process of claim 1, wherein the formed emulsion system is further dispersed into an inert receiving medium with a different temperature to cause a rapid solidification of the dispersed catalyst.

16. The process of claim 15, wherein the formed emulsion system is dispersed into said inert receiving medium with a temperature change of more than 40° C. within less than 10 seconds.

17. The process of claim 1, wherein said compound (a) is prepared by reacting Mg(R$^2$)$_2$ with an alcohol R$^1$OH, wherein R$^1$ and each R$^2$ is independently a hydrocarbyl radical selected from linear or branched alkyl radicals having 1 to 20 carbon atoms, to obtain a compound of the formula Mg(OR$^1$)$_{2-n}$R$^2_n$, wherein $0 \leq n < 2$ and wherein R$^1$ and R$^2$ are as defined before.

18. The process of claim 17, wherein said Mg(R$^2$)$_2$ is magnesium butyloctyl.

19. The process of claim 17, wherein said R$^1$OH is a branched alcohol having 5 to 10 carbon atoms.

20. The process of claim 17, wherein the catalyst component is formed by reacting a magnesium dialkyl compound, an alcohol, and an alkyl aluminum halide in the droplets dispersed in said inert continuous phase.

21. The process of claim 20, wherein the catalyst component is formed by reacting a magnesium dialkyl with an alcohol of formula R$^1$OH, wherein R$^1$ is a linear or branched C$_{2-10}$ alkyl, and adding to the obtained solution ethyl aluminum dichloride.

22. The process of claim 1, further comprising the step of (4) recovering the solid catalyst particles.

23. The process of claim 6, further comprising the step of (4) recovering the solid catalyst particles.

24. The process of claim 10, wherein the perfluorohydrocarbon, functionalized derivative thereof, or mixture thereof is selected from perfluoroalkanes, perfluoroalkenes, and perfluorocycloalkanes.

25. The process of claim 24, wherein the perfluoroalkane, perfluoroalkene, and perfluorocycloalkane is a $C_3$-$C_{30}$ perfluoroalkane, $C_3$-$C_{30}$ perfluoroalkene, and $C_3$-$C_{30}$ perfluorocycloalkane, respectively.

26. The process of claim 25, wherein the perfluoroalkane, perfluoroalkene, and perfluorocycloalkane is a $C_4$-$C_{10}$ perfluoroalkane, $C_4$-$C_{10}$ perfluoroalkene, and $C_4$-$C_{10}$ perfluorocycloalkane, respectively.

27. The process of claim 26, wherein the perfluoroalkane, perfluoroalkene, and perfluorocycloalkane is selected from perfluorohexane, perfluoroheptane, perfluorooctane, perfluoro (methylcyclohexane), and mixtures thereof.

28. The process of claim 14, wherein the gradual temperature change is 0.5-6° C. per minute.

29. The process of claim 28, wherein the gradual temperature change is 1-5° C. per minute.

30. The process of claim 16, wherein the temperature change is more than 50° C. within less than 6 seconds.

31. The process of claim 1, wherein the dispersed phase is formed from a solution prepared by contacting (a) a compound of a Group 2 metal of the Periodic Table (IUPAC), with (b) a compound of a Group 4 metal of the Periodic Table (IUPAC), and where the formation of the dispersed phase further comprises the addition of (c) a compound of a Group 13 metal of the Periodic Table (IUPAC), and/or with further catalyst component forming compounds.

32. The process of claim 31, wherein the compound of a Group 2 metal is a Mg compound, the compound of a Group 13 metal is an Al compound, and the compound of a Group 4 metal is a Ti compound.

33. The process of claim 17, wherein said $R^1OH$ is 2-ethyl hexanol.

34. The process of claim 20, wherein the catalyst component is formed by further reacting a tetravalent titanium compound in the droplets dispersed in said inert continuous phase.

35. The method of claim 21, wherein titanium tetrachloride is added after the ethyl aluminum dichloride to the obtained solution.

36. The process of claim 17, wherein the catalyst component is formed by reaction of an alkyl aluminum chloride with a magnesium alkoxide formed by reacting a magnesium dialkyl with an alcohol of formula $R^1OH$, wherein $R^1$ is a linear, cyclic or branched $C_{3-10}$ alkyl, and thereafter washing the obtained solid particles and treating said particles with other catalyst forming compounds selected from an aluminum compound and/or an external donor.

* * * * *